United States Patent [19]

Senften

[11] Patent Number: 5,050,519

[45] Date of Patent: Sep. 24, 1991

[54] BOAT TROLLING MOTOR CONTROL

[75] Inventor: David A. Senften, St. Peters, Mo.

[73] Assignee: Architectural Control Systems, Inc., St. Louis, Mich.

[21] Appl. No.: 560,011

[22] Filed: Jul. 26, 1990

Related U.S. Application Data

[63] Continuation of Ser. No. 342,103, Apr. 24, 1989, abandoned.

[51] Int. Cl.$^5$ ............................................. B63H 25/00
[52] U.S. Cl. ................................................ 114/144 E
[58] Field of Search ................... 440/6, 7; 114/144 R, 114/144 E, 144 B; 340/347 P; 367/95, 99, 107, 116, 118, 124, 88, 106

[56] References Cited

U.S. PATENT DOCUMENTS

| | | |
|---|---|---|
| 3,280,311 | 10/1966 | Shatto et al. ..................... 114/144 B |
| 3,541,717 | 11/1970 | Grayson ............................... 367/106 |
| 3,588,796 | 6/1971 | Armistead et al. ............. 114/144 B |
| 3,656,095 | 4/1972 | Cavey .................................. 367/106 |
| 3,797,448 | 3/1974 | Cramer .................................... 440/6 |
| 3,922,630 | 11/1975 | Murphree .......................... 367/106 |
| 3,995,579 | 12/1976 | Childre .................................... 440/7 |
| 4,200,922 | 4/1980 | Hageman ............................ 367/388 |
| 4,737,940 | 4/1988 | Arringotn ........................... 440/113 |
| 4,744,322 | 5/1988 | Nakase ..................................... 440/6 |
| 4,766,834 | 8/1988 | Miyayama et al. ............. 114/144 E |

Primary Examiner—Jesus D. Sotelo
Attorney, Agent, or Firm—Rogers, Howell & Haferkamp

[57] ABSTRACT

A motor control system for a boat used for fishing in which the propulsion motor is automatically responsive to a control system for moving the boat at a desired distance from a habitat where fish are suspected to be found. The motor control system may be selectively responsive to one of several different types of control input such as sonar range device, radio frequency, optical or infrared transmitter, or cable control provisions.

23 Claims, 3 Drawing Sheets

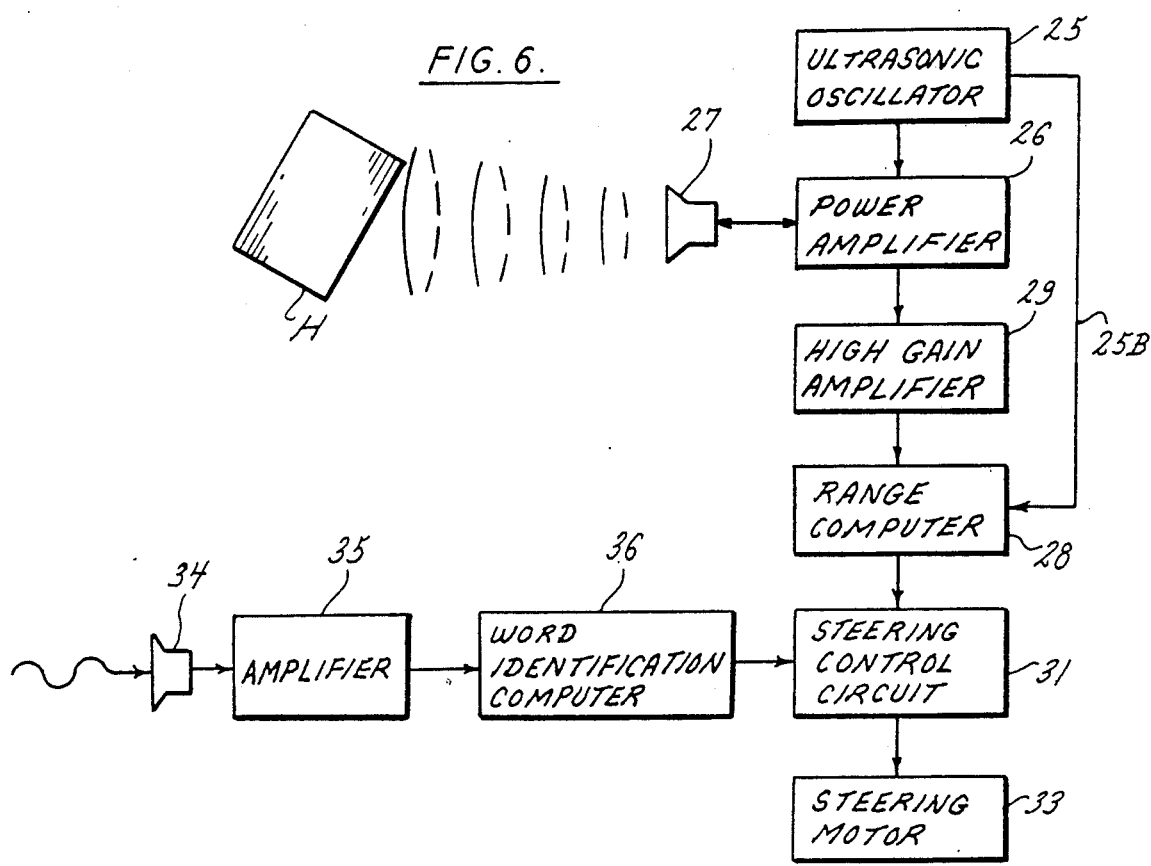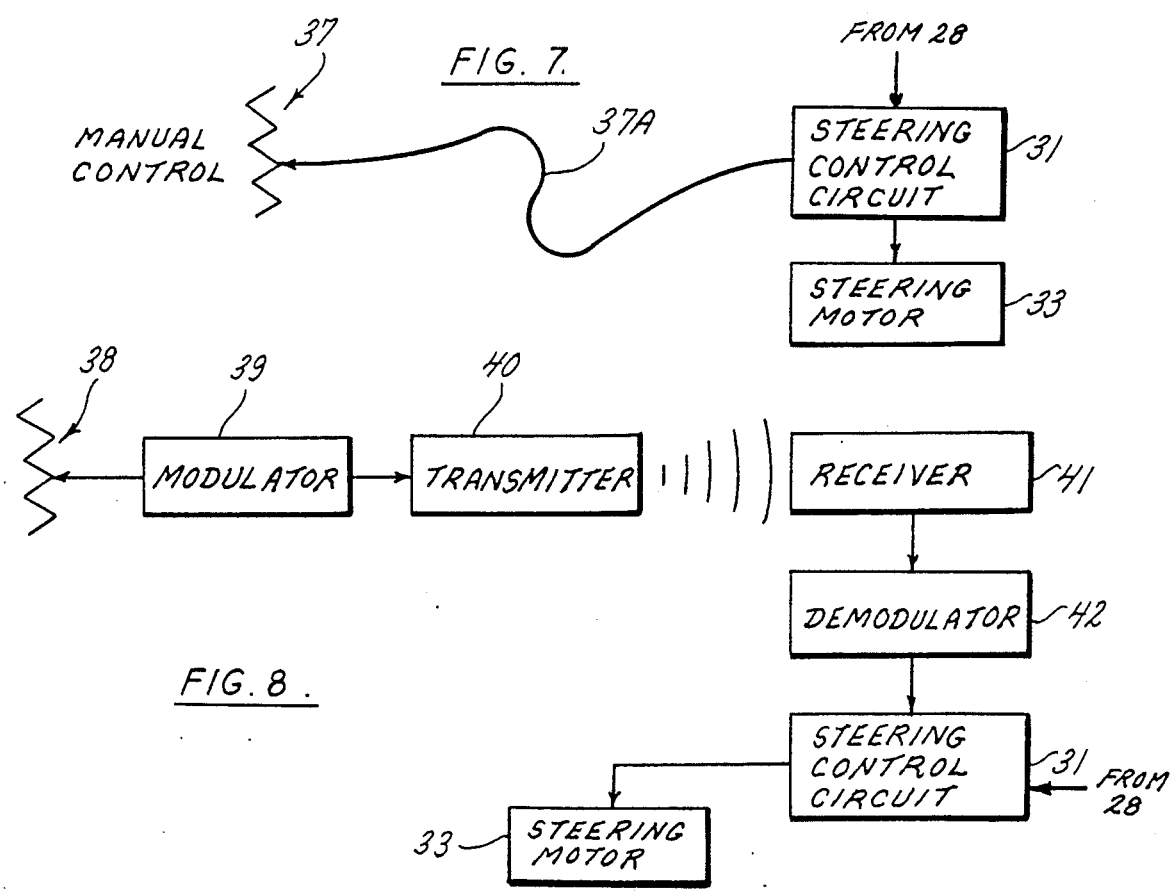

BOAT TROLLING MOTOR CONTROL

This is a continuation of co-pending application Ser. No. 07/342,103 filed on Apr. 24, 1989, now abandoned.

BACKGROUND OF THE INVENTION

1. Field of the Invention

This invention relates to a system effecting control over a trolling motor control so a boat may be directed along a course adjacent a suspected habitat for fish.

2. Description of the Prior Art

It has been known in sport and recreational fishing to equip the boat with a trolling motor which is able to move the boat slowly and in a course spaced from a shore line, a suspected fish habitat, or other places of natural or man-made structures where fish are likely to be found.

Usually the trolling motor is operated in such a manner as to move the boat along such objects as described above while maintaining a relatively constant distance from the object such that the fish in and about the objects are not alerted to the presence of the boat and thus frightened off, while also maintaining close enough proximity to allow the person fishing to cast or otherwise present appropriate lures or bait to the fish.

Originally, trolling motors used as described above were steered by hand, and since more or less constant attention had to be paid by the operator to steering, that activity interfered negatively with the primary activity and pleasure of fishing.

An example of a steerable motor for driving a boat used for fishing is seen in U.S. Pat. No. 3,797,448 of Mar. 19, 1974. The trolling Motor system uses an electric motor to drive a propeller and uses the same motor by remote electrical control to change the orientation of the motor and propeller to steer the boat in different directions.

Another example of a steering control system is seen in U.S. Pat. No. 3,995,579 of Dec. 7, 1976 in which a pair of reversible electronic motors are provided with a foot actuated control to select the direction of travel of a boat. Other foot operated control systems for trolling boats are seen in U.S. Pat. Nos. 4,565,529 of Jan. 27, 1986 and 4,569,663 of Feb. 11, 1986. The foot pedal used for steering is uncomfortable and tiring to use for long periods of time and can only be used safely while seated. And, if the operator moves about the boat or even turns to fish out of the other side of the boat the pedal mechanism and its attached cables must be moved accordingly.

BRIEF SUMMARY OF THE INVENTION

A solution to these problems is to sense the location of and distance to the shoreline or other objects, such as fixed structures well known to be choice fish habitats, by an ultrasonic ranging device, such as sonar, either under water or above, or by an optical ranging system either visible or infrared, or radio ranging devices such as radar. The information gathered by one or more of these sensing devices is then transformed by suitable electronic circuitry to signals which will automatically steer the trolling motor means, or steer the boat by appropriately powering a secondary trolling motor directed at an angle to the main motor so as to maintain the preferred distance between the boat and the fish habitat objects being fished referred to.

It is an object of the present invention to provide power steering means to control a trolling motor means to obtain the desired direction of travel and any deviations from that direction.

Another object is to provide electronic circuitry responsive to signals from an ultrasonic transducer which, in turn, responds to echo signals received from a fish habitat or similar objective as a result of ultrasonic sound pulses which have been directed toward the objective by the same or some other ultrasonic transducer.

A further object of the present invention is to provide a remote operator control capability to adjust motor speed, adjust the desired distance from a habitat, or to allow other means of control if deemed appropriate, such as voice control, control by radio frequency, optical or infrared, sonic or ultrasonic transmitter means, or a cable connected control, they are all useable to accomplish this remote manual control to augment the aforesaid automatic control. Any of these systems will provide signals to adjust, initiate change, interrupt, override, or otherwise intervene in the automatic control of the steering.

An additional object of the present invention is to employ a pair of motors at different angles of thrust to respond to appropriate signals for adjusting either or both the forward speed of the boat and its direction of steering.

BRIEF DESCRIPTION OF THE DRAWINGS

The present invention is conveniently illustrated in certain of its embodiments in the following drawings, wherein:

FIG. 6 is a block diagram of a system for remote voice control of the steering motor control circuit;

FIG. 7 is a fragmentary control means of manually manipulated control by cable for the block diagram seen in FIG. 6; and FIG. 8 is a further fragmentary control means of remote character for use in a block diagram seen in FIG. 6.

DETAILED DESCRIPTION OF THE EMBODIMENTS

Figure 1:
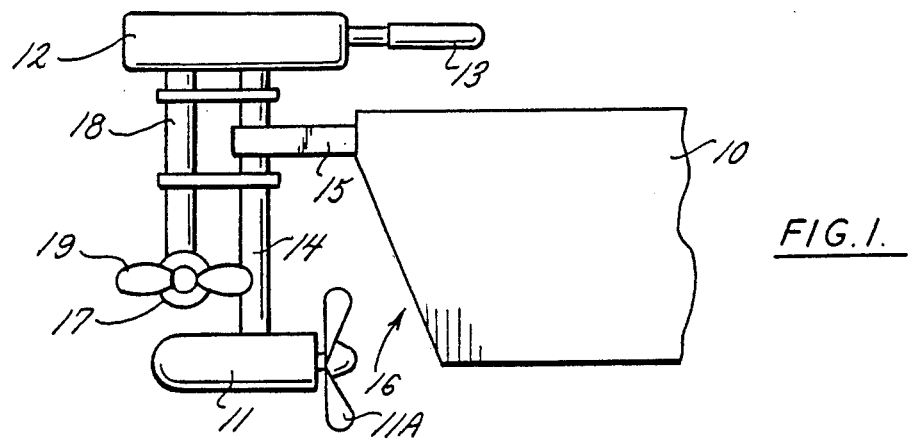
FIG. 1 is an assembly view of a fragmentary bow portion of a boat equipped with a principal trolling motor and a steering motor subject to the direction of the occupant of the boat.

In FIG. 1 the occupant of a boat 10 controls the bow mounted main electric trolling motor 11 from the housing 12 which has a projecting trolling motor speed control stalk 13 operable through control means in housing 12 connected through the motor support shaft 14. That shaft is attached by a suitable mount 15 on the bow 16 of boat 10.

The steering motor 17 is an electrically powered auxiliary motor carried by a mount 18 to assume a position with its axis of thrust of the propeller 19 at substantially ninety degrees to the thrust axis of the propeller 11A driven by the principal motor 11. That steering motor 17 is controlled by the circuit arrangement in housing 12.

Figure 2:
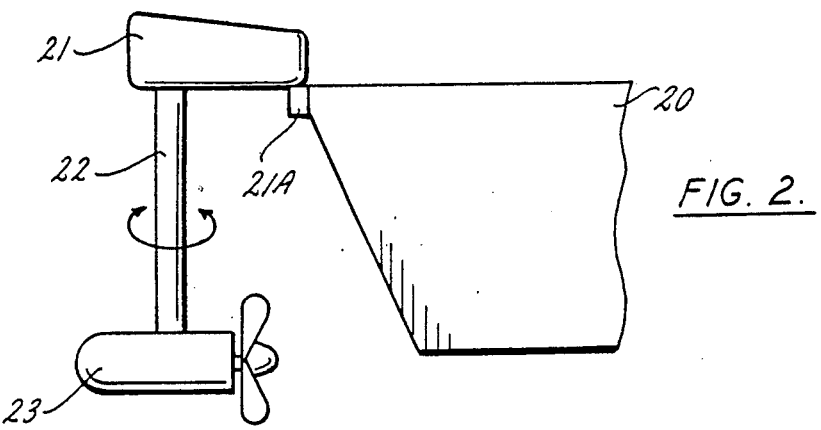
FIG. 2 in an assembly view of a fragmentary bow portion of a boat equipped with a single motor that is employed for trolling and steering.

Turning now to FIG. 2, the embodiment illustrated there is of a boat 20 being provided with a bow mounted control housing 21. The housing 21 is attached to the boat by a bracket 21A, while the housing supports a shaft 22 connected to an electric trolling motor 23, the shaft 22 being used as a conduit through which power leads to the motor 23 can be protected from the water. The control provisions in the housing 21 include reversible motor means for rotating the shaft 22 to position the motor 23 for both trolling speed and steering so the boat can be controlled as to its position or distance from a fish habitat.

Figure 3:
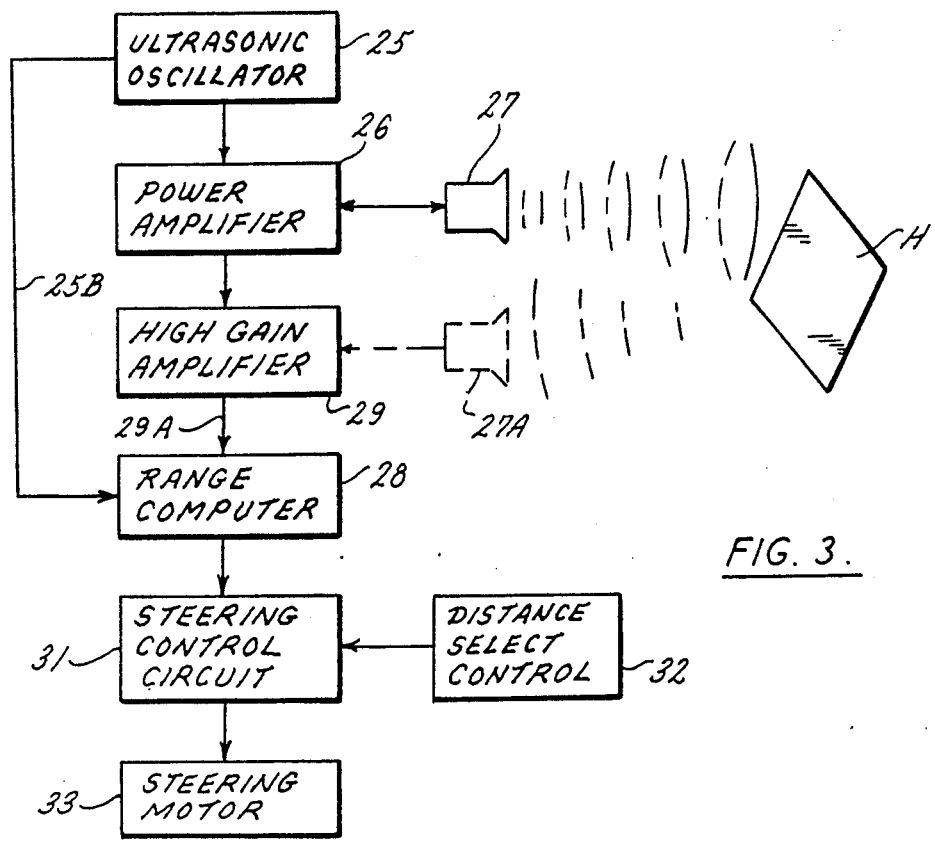
FIG. 3 is a block diagram of a preferred control arrangement to be incorporated in either of the embodiments of FIGS. 1 and 2.

FIG. 3 sets forth a block diagram for a control system of a character that meets the requirement of the embodiments of either FIG. 1 or FIG. 2 in relation to the trolling speed of boats 10 or 20 and the distance to be maintained from a selected fish habitat H of interest to the occupant of either boat. In the diagram an ultrasonic oscillator 25 provides the drive through a power amplifier 26 to periodically energize an ultrasonic transducer 27 for broadcasting intermittent pulses toward the selected habitat. The operation of the ultrasonic oscillator 25 is associated with a suitable range computer 28. Thus, the periodic pulses broadcast by the transducer 27 are followed by the sensed reception by the ultrasonic transducer 27 of such returning echos as can be processed by the computer 28 for comparison with the broadcast pulses by the ultrasonic transducer 27. The return pulses are amplified by the high gain amplifier 29 and received in the computer 28.

The computer processes the timings of the broadcast and reception of pulses and calculates the distance which is then processed by the steering control circuit 31 in relation to the distance factor which the occupant of the boat has inserted by manipulation of a distance select control 32. The result of that operation of the circuits in items 31 and 32 is transmitted to the steering motor 33. In the case of the arrangement of Motors 11 and 17 in FIG. 1, the signal from the control housing 12 causes the steering motor 17 to respond to cause the boat 10 to maintain the distance or change the distance between the boat 10 and the habitat H. That operation of motor 17 is independent of the operation of Motor 11 which keeps the boat 10 moving even during a distance sensing function.

In the case of the arrangement seen in FIG. 2, the function of the control system of FIG. 3 associated with a boat 20 equipped with a single motor 23 is to satisfy the speed as well as direction of the boat 20 to maintain the distance from a selected habitat H. Thus, the control system must rotate the shaft 22 to effect the results desired. In doing this the motor 23 needs to be adjusted in its speed so the boat does not alter its forward speed while changing its distance from the habitat. It is understood that the bow located motor needs to be speed adjusted so that while pulling the boat 20 toward or away from the habitat the forward headway is not materially changed.

There is indicated in FIG. 3 alternate arrangements for providing one or two ultrasonic transducers for broadcasting and receiving return echoes from the broadcasting of ultrasonic pulses. For example in FIG. 3 there is shown a single transducer 27 for broadcasting intermittent pulses from the oscillator 25, and during silent intervals returning echoes sensed, at the transducer 27 are amplified at the high gain amplifier 29. The return echoes received by the transducer are transmitted by circuits 29A and 25B to the range computer 28 for evaluation of, or comparing the distance between the boat (10 or 20) and a desired fish habitat H which can be a fixed or solid structure.

An alternate arrangement may include a second ultrasonic transducer 27A for sensing return echoes. In this case there is no need to connect the power amplifier 26 with the high gain amplifier.

Figures 4, 5:
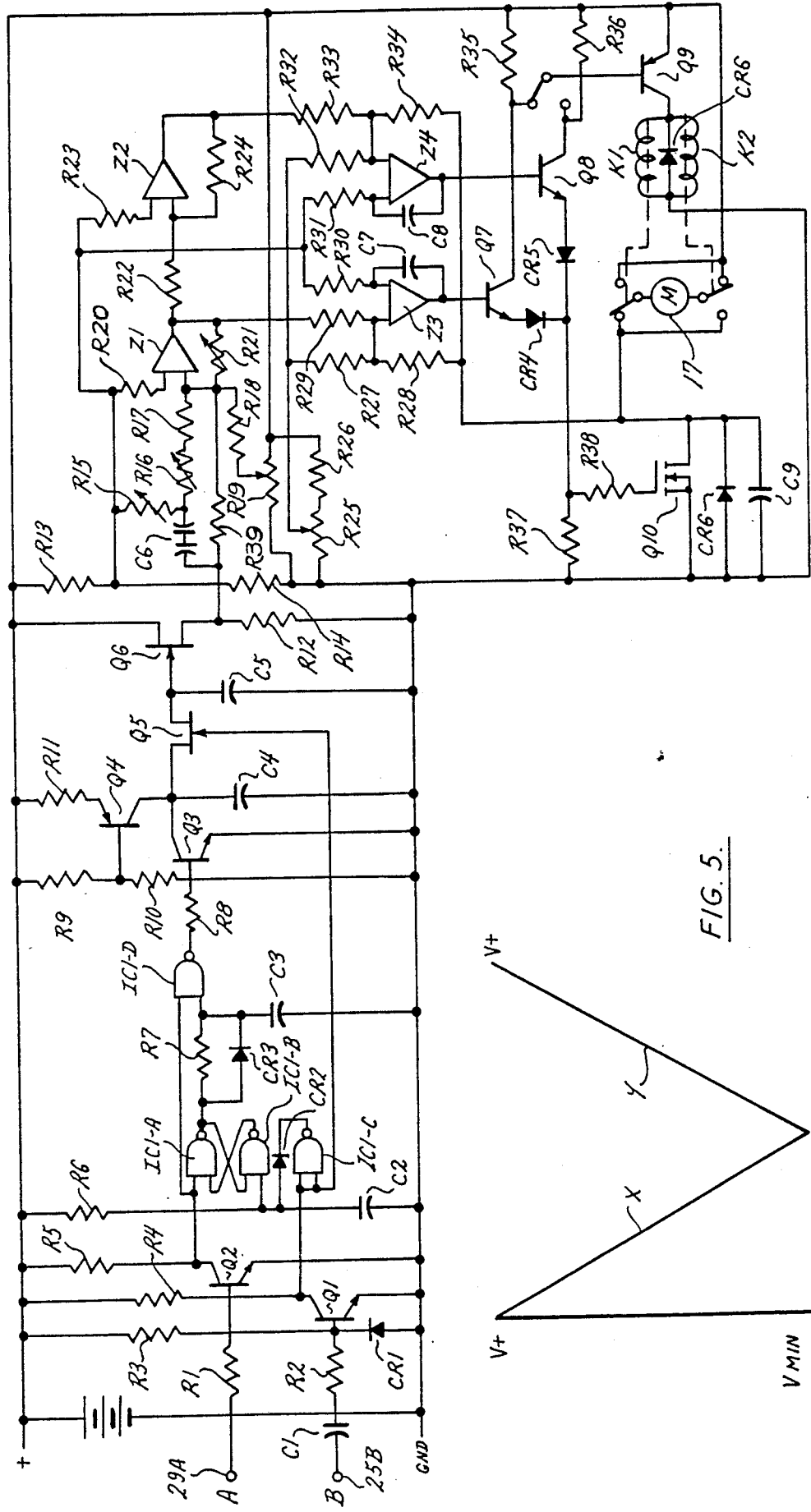
FIG. 4 is a circuit diagram for the circuit indicated in FIG. 3.
FIG. 5 is a motor power amplifier output diagram.

In the circuit diagram of FIG. 4, circuit inputs "A" and "B" are equivalent to leads 29A and 25B of FIG. 3 which receive signals from well known commercially available sonar depth sounding equipment circuitry.

As described previously the ultrasonic oscillator transducer 27 or sounding equipment is directed approximately horizontally toward the fish habitat being fished. The signals produced at "A" and "B" are therefore representative of the distance to the habitat being scanned. The circuitry shown here takes these signals and sends other signals to auxiliary steering motor 17, described earlier, so as to maintain an approximately constant distance between the fishing boat 10 and the habitat H being fished.

As can be well understood from the art, a pulse is produced at "B" in the FIG. 4 circuit in a cyclic pattern by the sonar circuitry. Through the action of transister Q1, resister R4, nand gate IC1-C and diode CR2, the latch formed by IC1-A and IC1-B is reset forcing the output of nand gate IC1-D to a high state. This in turn turns on transistor Q3 which discharges the voltage in capacitor C4. (It should be noted that this function is delayed slightly by the action of resistor R7 and capacitor C3 to allow prior function of transistor Q5 which is described later). At the end of this pulse the voltage in capacitor C2 begins to rise slowly due to the action of resistor R6 and capacitor C2.

At a predetermined and constant time later, a pulse occurs at "A" which coincides with the transmit pulse from the sonar equipment. Because the voltage in capacitor C2 is still at a low level, the latch formed by nand gates IC1-A and IC1-B cannot latch in the set condition thus ignoring this later pulse.

At some unknown time later, another pulse occurs at "A" which corresponds with the reception of the returning echo from the transmitted sonar pulse. Since the voltage in capacitor C2 is now at a higher level, the latch will be set. This causes the output of nand gate IC1-D to go to a low state when the pulse at "A" ends. This in turn turns off transistor Q3 and allows the voltage in capacitor C4 to rise at a linear rate due to the constant current source provided by resistors R9, R10, R11 and transistor Q4.

At the next pulse at "B", the instantaneous value of the voltage in capacitor C4 is transferred to capacitor C5 by the action of transistor Q5 just prior to the next reset function as described above.

It can be seen that as the distance to the object causing the echo return, gets larger, the echo occurs later causing the voltage in capacitor C4 to be lower when the next pulse at "B" occurs. Thus, the lower the voltage in capacitor C5 at any time, the farther is the distance to the object seen by the sonar unit. Transistor Q6 and resistor R12 form a high impedence unity gain amplifier which prevents degradation of the voltage signal in capacitor C5.

Operational amplifier Z1 and resistors R18, R20, R21 and R39 form a variable gain amplifier which sums the actual distance signal stored in capacitor C5 and the operator's desired distance signal which he has set manually in potentiometer R19.

The network composed of resistors C6, R15, R16 and R17, provides a feed-forward action which allows the circuit to anticipate the motor's power needs to correct the boat's position.

The remaining operational amplifiers Z2, Z3 and Z4, resistors R22, R23, R24, R27, R28, R29, R30, R31, R32, R33, R34, R37, R38, capacitors C7, C8 and C9, diodes CR4, CR5 and CR6, and transistors Q7, Q8 and Q10 form a power amplifier with an output function as described in FIG. 5.

The diagram of FIG. 5 illustrates that when the boat is at the desired distance from a fish habitat H the motor voltage is close to its lowest value. If the distance evaluation is either too close or too far from the desired distance, the control circuit has the capability of applying voltage to the motor 17 either in one polarity or the other along curves X or Y to adjust the position of the boat relative to the habitat H. It should be noted FIG. 5 that when VIN=VR the polarity of the voltage applied to the motor is reversed by the action of Q7, Q8, Q9, K1 and K2. The output voltage of that point ("V MIN") is adjustable by potentiometer R25 for a smooth crossover.

Turning now to FIG. 6 there is disclosed a control system which is similar to the system shown in FIG. 3 in so far as the components are concerned which are identified in FIG. 3. Accordingly the same components disclosed in FIG. 6 will be identified by the same reference numerals. The variation in FIG. 6 over the system disclosed in FIG. 3 embodies a speaker 34 which picks up voice commands that are amplified in a amplifier 35 and processed in the word identification computer 35 which then transmits the voice commands into the transfer by word identification into the steering control circuit 31 which, in turn, commands the steering motor 33 to perform in accordance with the voice commands.

An alternative control system is depicted in FIG. 7 which embodies a manual control 37 which is carried by a cable 37A directly into the steering control circuit 31. The result is that the manual control can be operated by the occupant of the boat at will, depending on the circumstance identified by the occupant of the boat and that cable transmitted control will be delivered to the steering control circuit 31 for determining the effect on the steering motor 33. It is of course recognized by the arrow leading into box 31 that the circuits of FIG. 6 are to be included.

A still further control system is shown in FIG. 8 where a manual control 38 provides signals for a modulator 39 which signals are then broadcasted by a transmitter 40 into a suitable receiver 41 which then is connected in a suitable circuit to a demodulator 42 which is connected into the steering control circuit 31 previously identified for commanding the response of the steering motor 33. Here again, the arrow entering box 31 indicates that the circuits of FIG. 6 are to be included.

The respective control systems disclosed in FIG. 6, 7 and 8 are referred to in some further detail in the specification with respect to the use of voice control remote systems, radio frequencies, optical, or infrared control systems, or even cable connected control systems. All of these systems are intended to be employed in substitution for the system disclosed in FIG. 3.

While the foregoing specification and drawings disclose alternate control systems, such disclosures are not to be limited or restricted unnecessarily.

What is claimed is:

1. A system for effecting automatic movement of a boat to maintain the boat at selected distances from selected objects, such as shores, fixed structures, and suspected fish habitats, the system comprising:
    motor means supported by the boat for propelling and steering the boat;
    a controller carried by the boat with circuit means for automatically controlling said motor means, said controller further comprising;
    means for transmitting signals toward a selected object;
    means for sensing the distance from the boat to the selected object in response to said transmitted signals;
    means for selecting a desired distance to be maintained between the boat and said object;
    means for comparing the sensed distance with the selected desired distance; and
    means for operating said motor means, upon the sensed distance being different from the selected desired distance, to drive the boat toward a position where the sensed and selected desired distances are substantially the same.

2. The system of claim 1 wherein said means for operating said motor means further comprises means to drive the boat in a direction to reduce the distance sensed by the sensing means upon the sensed distance being greater than the selected desired distance, and to increase the distance sensed by the sensing means upon the sensed distance being less than the selected desired distance.

3. The system of claim 1 wherein said means for selecting a desired distance is responsive to manually adjusted means.

4. The system of claim 1 wherein said selected desired distance is selected by vocal commands.

5. The system of claim 1 wherein said means for selecting a desired distance further comprises a remote control.

6. The system of claim 5 wherein said remote control operates through a cable for selecting a desired distance.

7. The system of claim 5 wherein said remote control operates through aerial transmission for selecting a desired distance.

8. The system of claim 1 wherein the transmitting means comprises means for generating signals and directing said signals from said boat toward said object to create reflected echoes of said signals, said means for sensing comprising means at said boat for receiving the reflected echoes, and for sensing the distance from the boat to the object in response to the time that elapses between the generation of the signals and the receipt of the echoes.

9. The system of claim 1 wherein said motor means is a trolling motor used for fishing.

10. A controller carried by a boat having circuit means for effecting automatic movement of the boat by controlling a motor means of the boat to maintain the boat at selected distances from selected objects such as shores, fixed structures, and suspected fish habitats, the controller comprising:
    means for transmitting signals toward a selected object;

means for sensing the distance from the boat to the selected object in response to said transmitted signals;

means for selecting a desired distance to be maintained between the boat and said object;

means for comparing the sensed distance with the selected desired distance; and means for operating said motor means, upon the sensed distance being different from the selected desired distance, to drive the boat toward a position where the sensed and selected desired distances are substantially the same.

11. The controller of claim 10 wherein said means for operating said motor means further comprises means to drive the boat in a direction to reduce the distance sensed by the sensing means upon the sensed distance being greater than the selected desired distance, and to increase the distance sensed by the sensing means upon the sensed distance being less than the selected desired distance.

12. The controller of claim 9 wherein the transmitting means comprises means for generating signals and directing said signals from said boat toward said object to create reflected echoes of said signals, said means for sensing comprising means at said boat for receiving the reflected echoes and for sensing the distance from the boat to the object in response to the time that elapses between the generation of the signals and the receipt of the echoes.

13. A system for effecting automatic movement of a boat to maintain the boat at selected distances from selected objects, such as shores, fixed structures, and suspected fish habitats, the system comprising:

motor means supported by the boat for propelling and steering the boat;

a controller carried by the boat with circuit means for automatically controlling said motor means, said controller further comprising:

means for transmitting signals toward a selected object;

means for generating first signals representing the distance from the boat to a selected object in response to said transmitted signals;

means for generating second signals representing a selected desired distance to be maintained between the boat and said object;

means for comparing said first and second signal; and means for operating said motor means, to drive the boat in a direction that will cause said first and second signals to compare in a predetermined correspondence.

14. The system of claim 13 further comprising means for generating pulses and directing said pulses from said boat toward said object to create reflected echos of said pulses, means at said boat for receiving the reflected echos, and means for generating said first signal in response to the time that elapses between the generation of said pulses and the receipt of the echo.

15. The system of claim 14 wherein said pulses are ultrasonic pulses.

16. The system of claim 14 wherein said pulses are optical pulses.

17. The system of claim 14 wherein said pulses are infrared pulses.

18. The system of claim 14 wherein said motor means is a trolling motor used for fishing.

19. A system for effecting automatic movement of a boat to maintain the boat at selected distances from selected objects as the boat moves, said objects be ever changing such as ever changing locations along a shore, the system comprising:

motor means supported by the boat for propelling and steering the boat;

a controller carried by the boat with circuit means for automatically controlling said motor means, said controller further comprising;

means for transmitting signals toward said selected objects as the boat moves;

means for sensing the distance from the boat to the selected objects as the boat moves;

means for selecting a desired distance to be maintained between the boat and said objects as the boat moves;

means for comparing the sensed distances with the selected desired distance; and means for operating said motor means, upon a sensed distance being different from the selected desired distance, to drive the boat toward a position where the sensed and selected desired distances are substantially the same to maintain the boat at selected distances from selected objects as the boat moves.

20. The system of claim 19 wherein the transmitting means comprises means for generating signals and directing said signals from said boat toward said objects to create reflected echoes of said signals, said means for sensing comprising means at said boat for receiving the reflected echoes, and for sensing the distances from the boat to the objects in response to the time that elapses between the generation of the signals and the receipt of the echoes.

21. The system of claim 20 wherein said motor means is a trolling motor used for fishing.

22. A controller carried by a boat having circuit means for effecting automatic movement of the boat by controlling a motor means of the boat to maintain the boat at selected distances from selected objects as the boat moves, said objects being ever changing such as ever changing locations along a shore, said controller comprising:

means for transmitting signals toward said selected objects as the boat moves;

means for sensing the distances from the boat to the selected objects as the boat moves;

means for selecting a desired distance to be maintained between the boat and said objects as the boat moves;

means for comparing the sensed distances with the selected desired distance; and means for operating said motor means, upon a sensed distance being different from the selected desired distance, to drive the boat toward a position where the sensed and selected desired distances are substantially the same to maintain the boat at selected distances from selected objects as the boat moves.

23. The controller of claim 22 wherein the transmitting means comprises means for generating signals and directing said signals from said boat toward said objects to create reflected echoes of said signals, said means for sensing comprising means at said boat for receiving the reflected echoes, and for sensing the distances from the boat to the object in response to the time that elapses between the generation of the signals and the receipt of the echoes.

* * * * *